US005093764A

United States Patent [19]

Hasegawa et al.

[11] Patent Number: 5,093,764

[45] Date of Patent: Mar. 3, 1992

[54] SELF-ILLUMINATING COAXIAL KNOB

[75] Inventors: Yoshihiko Hasegawa; Tadanori Kinoshita; Tsuneo Ueda, all of Utsunomiya, Japan

[73] Assignee: Stanley Electric Co., Ltd., Tokyo, Japan

[21] Appl. No.: 678,608

[22] Filed: Apr. 1, 1991

[30] Foreign Application Priority Data

Apr. 5, 1990 [JP] Japan .............................. 2-36740[U]

[51] Int. Cl.[5] ......................... G01D 11/28; E05B 1/00

[52] U.S. Cl. ......................................... 362/29; 362/86; 362/26; 362/30; 362/31; 116/202

[58] Field of Search ....................... 362/23, 24, 26, 29, 362/30, 31, 86, 92, 100, 253; 116/202, 310, DIG. 5, DIG. 26

[56] References Cited

U.S. PATENT DOCUMENTS

| | | | |
|---|---|---|---|
| 1,566,069 | 12/1925 | Buchholz et al. | 362/23 |
| 1,708,092 | 4/1929 | Heller | 362/23 |
| 2,130,367 | 9/1938 | Rylsky et al. | 362/23 |
| 2,648,305 | 8/1953 | Appleman | 362/26 |
| 2,693,165 | 11/1954 | Appleman | 362/30 |
| 2,763,231 | 9/1956 | Neugass | 362/23 |
| 4,998,318 | 3/1991 | Nohtomi et al. | 362/86 |
| 5,807,091 | 2/1989 | Obata | 362/26 |

FOREIGN PATENT DOCUMENTS

| | | | |
|---|---|---|---|
| 845909 | 9/1939 | France | 362/29 |

*Primary Examiner*—Ira S. Lazarus
*Assistant Examiner*—Y. Quach
*Attorney, Agent, or Firm*—Frishauf, Holtz, Goodman & Woodward

[57] ABSTRACT

A self-illuminating coaxial knob provided on an operating panel of an air conditioning apparatus, an acoustic apparatus or the like, in which an outer knob and an inner knob connected to an outer shaft and an inner shaft, respectively, are coaxially provided on a panel surface, the panel being provided with a graduation, and the knobs being provided with indexes, respectively. The outer knob is illuminated from the back by a panel surface illuminating portion circularly provided on a panel surface light guide, whereas the inner knob is illuminated by a ring-like inner knob light guide provided in a ring-like incoming portion.

3 Claims, 5 Drawing Sheets

PRIOR ART

PRIOR ART

SELF-ILLUMINATING COAXIAL KNOB

BACKGROUND OF THE INVENTION

1. Field of the Invention

The present invention relates to a coaxial knob provided on an operating panel, for example, of an air conditioning apparatus and an acoustic apparatus, and more specifically, to a coaxial knob provided with an illuminating device for facilitating an operation thereof at night.

2. Prior Art

FIGS. 5 and 6 show a structure of a conventional coaxial knob 91 of this kind. For example, in the case of an acoustic apparatus, a variable resistor 20 including an outer shaft 21 having a resistance control function and an inner shaft 22 having a switch function is very often employed.

In this case, an outer knob 92 with an index 92*a* showing a degree of adjustment, for example, such as an arrow, is mounted on the outer shaft 21, and an inner knob 93 with an index 93*a* showing a switch function, for example, such as "ON", is mounted on the inner shaft 22. A panel surface 23 is provided with a graduation 23*a* thereon to indicate the adjusted state. When use is expected at night or at dark places, the aforesaid panel surface 23 is made of a double configuration comprising, for example, a transparent member for the graduation 23*a* and an opaque member for the other member. A light source 24 disposed on the back of the panel surface 23 is lit to effect illumination so that the apparatus can be used at night.

However, in the above-described conventional apparatus, the graduation 23*a* can be certainly read at night but the index 92*a* or 93*a* to be matched thereto is never illuminated and therefore cannot be read. Thus, the aforementioned apparatus is not completely suitable for use at night, thus posing difficulties in the operation of apparatus at night.

SUMMARY OF THE INVENTION

For overcoming the above-described problem encountered in the prior art, the present invention provides, in a coaxial double knob in which an outer knob are and an inner knob connected to an outer shaft and an inner shaft, respectively, and are coaxially provided on a panel surface, and said panel surface is provided with a graduation and said knobs are provided with indexes, respectively, a self-illuminating coaxial knob characterized in that a light source is disposed on the back of said panel surface, said inner knob being formed from a transparent member and connected to said inner shaft through a knob housing for guiding light to the back of said inner knob, said outer knob being formed from a transparent member and being provided on one end with an outgoing portion opposite to said knob housing and on the other end with an incoming portion opposite to said light source at a flange-like outer edge, those portions other than said incoming portion being connected by an inner knob light guide formed into a cylindrical shape having substantially the same diameter as that of said inner knob, and a substantially plate-like panel surface light guide is arranged closely on the back of said panel surface, said panel surface light guide being formed from a transparent member and being provided with a through-hole through which said inner light guide extends, said panel surface light guide having one surface opposed to said light source and another surface being defined by a ring-like shield plate which is coaxial with said through-hole and is smaller in diameter than the outside diameter of said outer knob, said panel surface light guide having an inside to serve as an outer knob illuminating portion and an outside to serve as a panel surface illuminating portion. With this arrangement, illumination for the index can be attained, and visibility at night is enhanced, thus solving the aforementioned problem of the prior art.

According to the present invention, a color filter formed with a through-hole through which the inner knob light guide extends is attached to the top of the shield plate.

Furthermore, according to the present invention, either the inner knob light guide or the knob housing is formed from a colored transparent member.

DETAILED DESCRIPTION OF THE PREFERRED EMBODIMENTS

Figure 1:
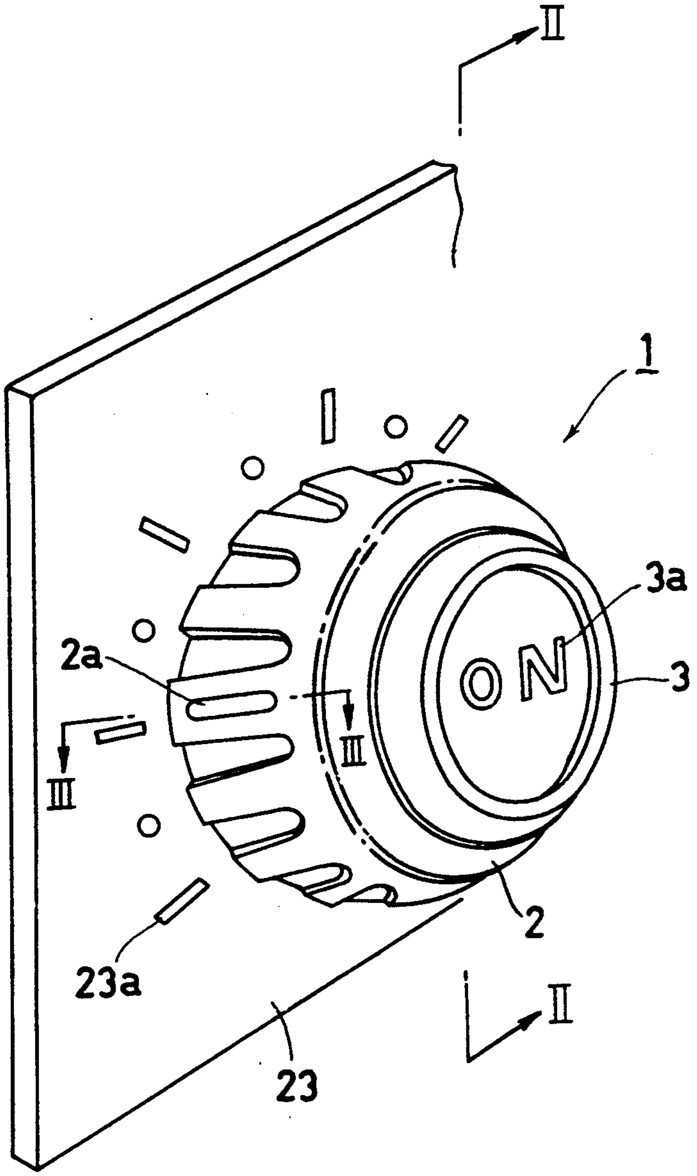
FIG. 1 is a perspective view showing one embodiment of a self-illuminating coaxial knob according to the present invention.

The present invention will now be described in detail by way of embodiments shown in the accompanying drawings.

For better understanding, the same parts as those of the conventional example are indicated by the above-described same reference numerals, and such same parts will be omitted from the following explanation.

Figure 2:
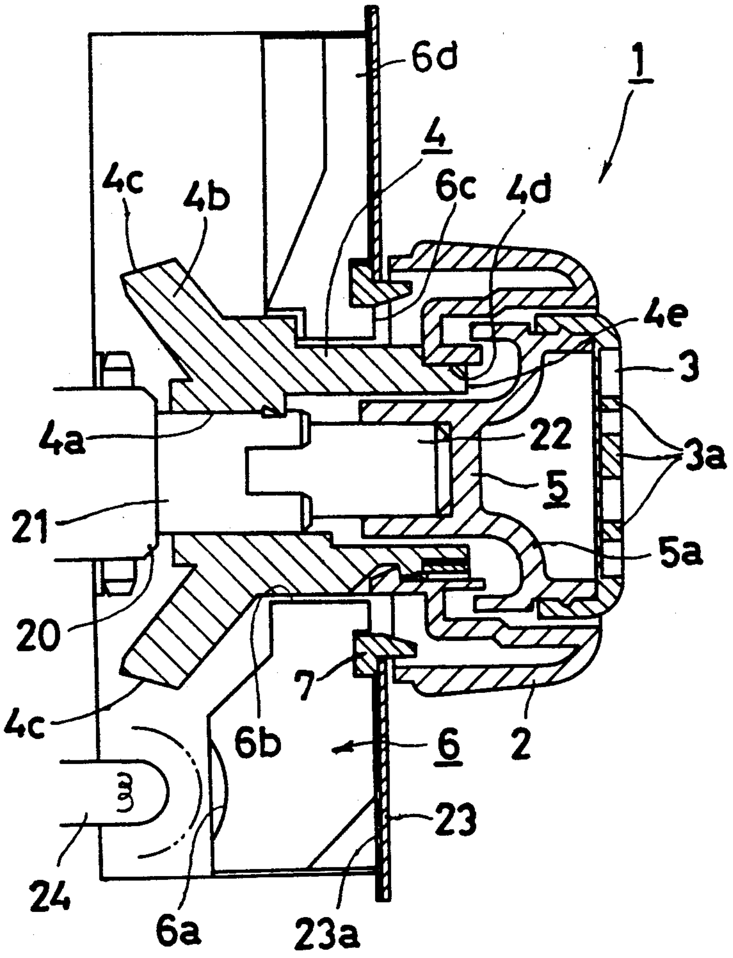
FIG. 2 is a sectional view taken on line 2—2 of FIG. 1.

In FIGS. 1 and 2, a self-illuminating coaxial knob according to the present invention is indicated at 1. In this self-illuminating coaxial knob 1, an outer knob 2 and an inner knob 3 are coaxially provided on a panel surface 23 with a graduation 23*a* thereon. The outer knob 2 is connected, for example, to an outer shaft 21 of a variable resistor 20, and the inner knob 3 is likewise connected to the inner shaft 22 so that both the shafts 21 and 22 are operated by operating both the knobs 2 and 3 respectively. A light source 24 is provided on the back of the panel surface 23 similarly to the conventional apparatus. According to the present invention, the outer knob 2 is connected to the outer shaft 21 through the inner knob light guide 4.

The inner knob light guide 4 is formed, for example, from a transparent member such as resin and is formed as a whole into a cylindrical configuration in which the outside diameter is substantially matched to that of the inner knob 3. On one end of the guide 4, the outer shaft 21 is connected to an inner diameter portion 4*a* by a well known knurling construction as a connecting method of this kind, for example. A flange-like outwardly flared portion 4*b* is provided so as to project outwardly toward the light source 24 from a suitable position on the outside diameter side. An outer edge portion 4*c* of the outwardly flared portion 4*b* is opposed to the light source 24 so that even when the outer knob 2, which is connected to, the inner knob light guide 4, is rotated to any position, light from the light source 24 can be introduced into the inner knob light guide 4.

The outer knob 2 having a construction similar to that as described above is connected to an outer diameter portion 4d of the other end of the inner knob light guide 4. In this case, an end of the inner knob light guide 4 is axially exposed to form an outgoing portion 4e whereby light of the light source 24 introduced into the inner knob light guide 4 from the outer edge portion 4c, of the incoming portion 4b is emitted to the outside from the outgoing portion 4e.

One inner knob 3 is connected to the inner shaft 22 through a knob housing 5 formed of a transparent member similar to the outer knob 2.

The knob housing 5 has substantially the same diameter as the outside diameter of the inner knob light guide 4, and a portion opposed to the outgoing portion 4e forms a light introducing portion 5a having a convex lens shape, for example, so that light from the outgoing portion 4e can be illuminated on the back of the inner knob 3.

Here, the inner knob 3 is provided with an index 3a which can be read even at a dark place by illumination from the back by suitable means such as a double configuration comprising a transparent member and an opaque member. Light from the light source 24 reaches the back of the inner knob 3 via the inner knob light guide 4 and the knob housing 5 to illuminate the index 3a, thus achieving the object.

A substantially plate-like panel surface light guide 6, formed from a transparent member provided with a condenser 6a is opposed to the light source 24, in order to uniformly illuminate a graduation 23a applied to the panel surface 23 by suitable means, for example, such as a printed film. A substantially closed area is provided on the panel surface 23, and the panel surface light guide 6a is provided with a through-hole 6b through which the inner knob light guide 4 extends.

In addition, a ring-like shield plate 7 which is coaxial with the through-hole 6b and which is smaller in diameter than of the outer knob 2 is embedded on the side facing the panel surface 23 of the panel surface light guide 6, whereby the panel surface light guide 6 is divided into an outer knob illuminating portion 6c as a portion internally of the shield plate 7 and a panel surface illuminating portion 6d externally thereof.

Figure 3:
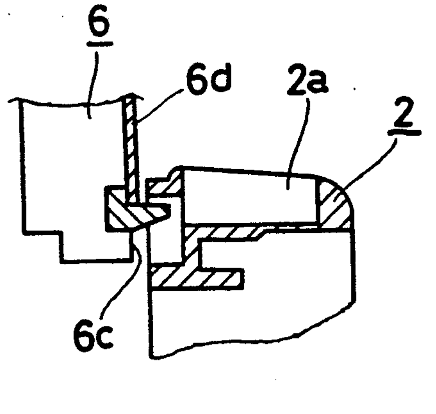
FIG. 3 is a sectional view of essential parts taken on line 3—3 of FIG. 3; ·

The outer knob 2 is provided with an index 2a formed from a transparent member similar to the inner knob 3 as shown in FIG. 3, and the outer knob illuminating portion 6c is coaxially circular so that even when it is rotated to any position, illumination can be achieved, and the index can be read at a dark place.

Figure 4:
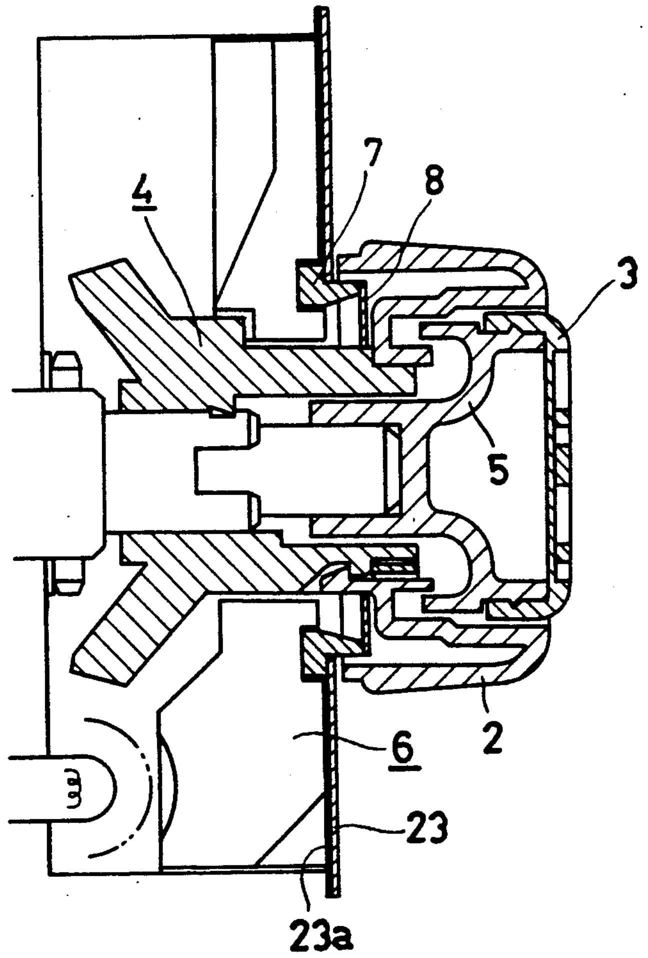
FIG. 4 is a sectional view showing a further embodiment of the present invention.
Figure 5:
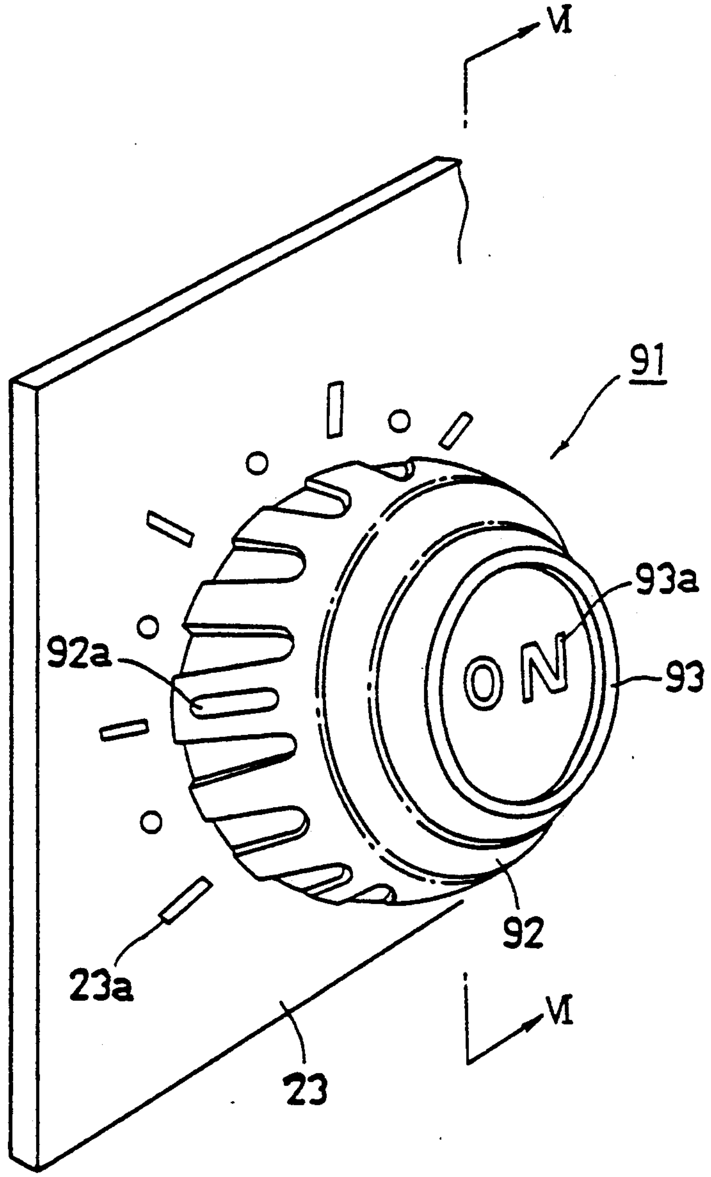
FIG. 5 is a perspective view showing a conventional apparatus.
Figure 6:
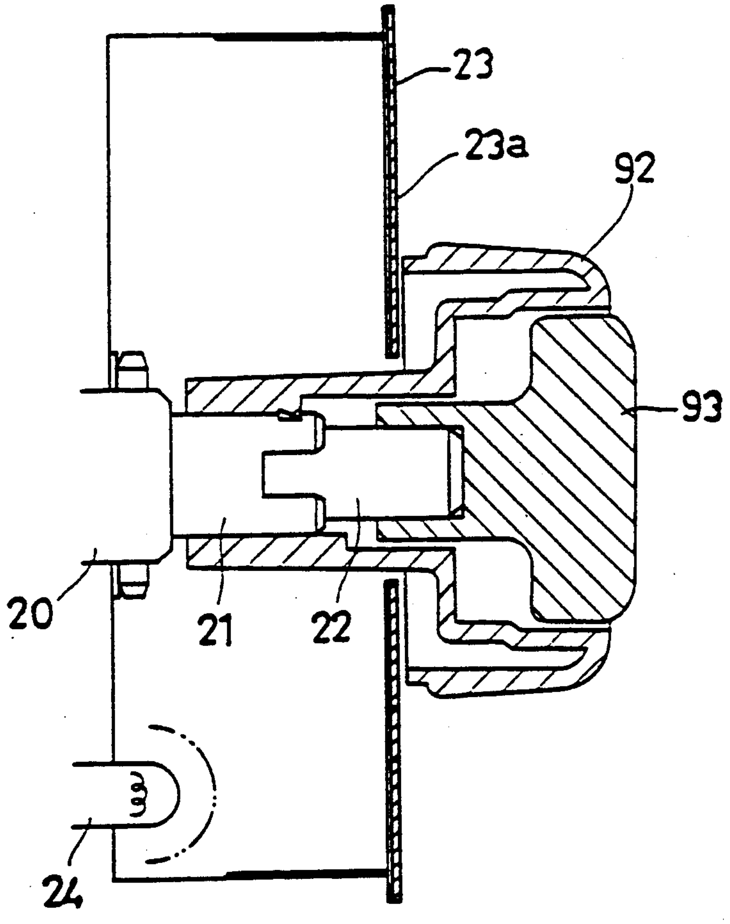
FIG. 6 is a sectional view taken on line 6—6 of FIG. 5.

A further embodiment of the present invention is shown in FIG. 4. As described above, according to the present invention, the outer knob 2 is illuminated by the outer knob illuminating portion 6c; the inner knob 3 is illuminated by the inner knob light guide 4 and the knob housing 5; and the panel surface 23 is illuminated by the panel surface illuminating portion 6d. In this way, light paths for illuminating various parts are respectively independent.

The present embodiment has been achieved in view of the foregoing. A color filter 8 colored, for example, in green, may be attached to the top (the outer knob 2 side) of the shield plate 7 so as to cover the outer knob illuminating portion 6c whereby the index 2a of the outer knob 2 is brightened in green. At the same time, if either the inner knob light guide 4 or the knob housing 5 is formed from a transparent member colored, for example, in red, the index 3a of the inner knob 3 is brightened in red. However, the panel surface 24 can be still illuminated in white light without being affected thereby.

Functions and effects other than those just mentioned are exactly the same as those described in connection with the previous embodiment, and therefore will not be further described.

As described above, according to the present invention, the outer knob is illuminated from the back by the panel surface illuminating portion coaxially circularly formed on the panel surface light guide, and in addition, the inner knob is illuminated by the inner knob light guide provided within the ring-like incoming portion. With this arrangement, light can be distributed together with the outer and inner knobs which are operated to be rotated irrespective of such operation, whereby the indicia provided on these knobs can be illuminated even at dark places, thus providing excellent effects contributing to improved practicability of the coaxial knobs of this kind.

What is claimed is:

1. A self-illuminating coaxial double knob arrangement, comprising:

an outer knob and an inner knob connected to an outer shaft and an inner shaft, respectively, said outer and inner shafts being coaxial with each other, and said outer and inner knobs being coaxially provided on a panel surface, said panel surface being provided with a graduation scale thereon, and said outer and inner knobs being provided with indexes, respectively:

a light source disposed on a back side of said panel surface;

said inner knob comprising a transparent member and connected to said inner shaft through a knob housing for guiding light to a back portion of said inner knob;

said outer knob comprising a transparent member, said outer knob being provided on one end thereof with an outwardly extending flange-like portion opposite to said knob housing, said extending toward said light source, said flange-like portion having an outer end portion positioned adjacent to said light source at a flange-like outer edge thereof for receiving and guiding light through said flange-like portion;

an inner knob light guide of substantially cylindrical shape and having substantially the same diameter as said inner knob, said inner knob light guide being connected to an inner portion of said flange-like portion for guiding light to said inner knob; and a substantially plate-like panel surface light guide arranged closely on the back side of said panel surface;

said panel surface light guide including a transparent member and being provided with a through-hole through which said inner knob light guide extends, said panel surface light guide further including a surface portion opposed to said light source and another surface comprising a ring-like shield plate which is coaxial with said through-hole and which is smaller in diameter than the outer diameter of said outer knob; and said panel surface light guide having an inside portion interior of said ring-like shield plate which is in light communication with said outer knob and serving as an outer knob illuminating portion, and an outside portion external of said ring-like shield plate and serving as a panel surface illuminating portion.

2. The self-illuminating coaxial knob of claim 1, further comprising a color filter having a through-hole therein, through which said inner knob light guide extends, said color filter being attached to a top portion of said shield plate.

3. The self-illuminating coaxial knob of claim 1, wherein at least one of said inner knob light guide and said knob housing is formed from a colored transparent member.

* * * * *

UNITED STATES PATENT AND TRADEMARK OFFICE

CERTIFICATE OF CORRECTION

PATENT NO. : 5,093,764

DATED : March 3, 1992

INVENTOR(S) : HASEGAWA et al

It is certified that error appears in the above-identified patent and that said Letters Patent is hereby corrected as shown below:

Title page, Section [56] References Cited, right column, change the USP "5,807,091" to read --4,807,091--.

Column 1, line 38, change "in the operation of" to read --in operation of the--.

Column 1, line 45, change "are and an inner knob" to read --and an inner knob are--.

Column 3, line 34, after "6α", insert --,--.

Column 3, line 38, change "6α" to --6--.

Column 3, line 43, delete "of" after "than".

Column 4, line 22, change "indicia" to --indices--.

Signed and Sealed this

Twenty-fourth Day of August, 1993

Attest:

Bruce Lehman

BRUCE LEHMAN

*Attesting Officer*

*Commissioner of Patents and Trademarks*